US011767268B2

(12) United States Patent
Ishii et al.

(10) Patent No.: US 11,767,268 B2
(45) Date of Patent: Sep. 26, 2023

(54) CUBIC BORON NITRIDE SINTERED MATERIAL

(71) Applicant: Sumitomo Electric Industries, Ltd., Osaka (JP)

(72) Inventors: Akito Ishii, Osaka (JP); Katsumi Okamura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/288,929

(22) PCT Filed: Dec. 16, 2019

(86) PCT No.: PCT/JP2019/049191
§ 371 (c)(1),
(2) Date: Apr. 27, 2021

(87) PCT Pub. No.: WO2021/124399
PCT Pub. Date: Jun. 24, 2021

(65) Prior Publication Data
US 2021/0309580 A1 Oct. 7, 2021

(51) Int. Cl.
*C04B 35/5831* (2006.01)
*C04B 35/58* (2006.01)
*C04B 35/626* (2006.01)
*C04B 35/645* (2006.01)

(52) U.S. Cl.
CPC .... *C04B 35/5831* (2013.01); *C04B 35/58014* (2013.01); *C04B 35/6262* (2013.01); *C04B 35/6264* (2013.01); *C04B 35/62675* (2013.01); *C04B 35/645* (2013.01); *C04B 2235/3217* (2013.01); *C04B 2235/386* (2013.01); *C04B 2235/3813* (2013.01); *C04B 2235/3847* (2013.01); *C04B 2235/3865* (2013.01); *C04B 2235/3886* (2013.01); *C04B 2235/404* (2013.01); *C04B 2235/405* (2013.01); *C04B 2235/6567* (2013.01); *C04B 2235/6581* (2013.01); *C04B 2235/721* (2013.01); *C04B 2235/725* (2013.01); *C04B 2235/762* (2013.01); *C04B 2235/9669* (2013.01)

(58) Field of Classification Search
CPC .......... C04B 35/5831; C04B 35/58014; C04B 2235/725; C04B 2235/3886; C04B 2235/3217; C04B 2235/3865; C04B 2235/3847; C04B 2235/762; C04B 2235/386; C04B 2235/404
See application file for complete search history.

(56) References Cited

U.S. PATENT DOCUMENTS

| | | | |
|---|---|---|---|
| 7,758,976 B2 * | 7/2010 | Kukino | C04B 35/581 428/698 |
| 2005/0143252 A1 | 6/2005 | Okamura et al. | |
| 2008/0254282 A1 | 10/2008 | Kukino et al. | |
| 2009/0169840 A1 | 7/2009 | Okamura et al. | |
| 2015/0328691 A1 | 11/2015 | Okamura et al. | |

FOREIGN PATENT DOCUMENTS

| | | |
|---|---|---|
| CN | 101102863 A | 1/2008 |
| EP | 1 870 185 A1 | 12/2007 |
| JP | 2005-187260 A | 7/2005 |
| JP | 2006-347850 A | 12/2006 |
| JP | 2017-30082 A | 2/2017 |
| JP | 2018-505839 A | 3/2018 |
| WO | 2007/039955 A1 | 4/2007 |
| WO | 2007/145071 A1 | 12/2007 |
| WO | 2016/109775 A1 | 7/2016 |

OTHER PUBLICATIONS

Decision to Grant dated Oct. 20, 2020 received for JP Application 2020-539022, 5 pages including English Translation.

* cited by examiner

*Primary Examiner* — Noah S Wiese
(74) *Attorney, Agent, or Firm* — XSENSUS LLP

(57) ABSTRACT

A cubic boron nitride sintered material comprises 30% by volume or more and 99.9% by volume or less of cubic boron nitride grains and 0.1% by volume or more and 70% by volume or less of a binder phase, the cubic boron nitride grain having a carbon content of 0.08% by mass or less, the cubic boron nitride sintered material being free of free carbon.

6 Claims, No Drawings

CUBIC BORON NITRIDE SINTERED MATERIAL

CROSS-REFERENCE TO RELATED APPLICATION

The present application is based on PCT filing PCT/JP2019/049191, filed Dec. 16, 2019, the entire contents of which are incorporated herein by reference.

BACKGROUND ART

Hardened steel having large strength and large toughness is used for gears, shafts, and bearing components of automobiles. In recent years, these components are required to have mechanical properties that can endure higher torque. In order to improve hardened steel in mechanical properties, for example, high-strength hardened steel comprising hardened steel as a base metal and hard grains dispersed in the base material has been developed.

Cubic boron nitride (hereinafter also referred to as "cBN") has a hardness second to that of diamond, and is also excellent in thermal stability and chemical stability. Accordingly, a cubic boron nitride sintered material (hereinafter also referred to as a "cBN sintered material") is used as a material for a cutting tool for high-strength hardened steel.

Japanese Patent Laid-Open No. 2017-030082 (PTL 1) discloses, as a cutting tool that can be used for intermittently cutting high-hardness steel, a cutting tool comprising a base composed of a cubic boron nitride sintered material comprising cubic boron nitride grains as a hard phase, and a TiC phase as a binder phase.

CITATION LIST

Patent Literature

PTL 1: Japanese Patent Laid-open No. 2017-030082

SUMMARY OF INVENTION

The presently disclosed cubic boron nitride sintered material comprises 30% by volume or more and 99.9% by volume or less of cubic boron nitride grains and 0.1% by volume or more and 70% by volume or less of a binder phase, the binder phase including:
  at least one selected from the group consisting of: a simple substance selected from the group consisting of a group 4 element, a group 5 element and a group 6 element of the periodic table, aluminum, silicon, cobalt and nickel; an alloy thereof; and an intermetallic compound thereof;
  at least one selected from the group consisting of: a compound consisting of at least one element selected from the group consisting of a group 4 element, a group 5 element and a group 6 element of the periodic table, aluminum, silicon, cobalt and nickel, and at least one element selected from the group consisting of nitrogen, carbon, boron and oxygen; and a solid solution derived from the compound; or
  at least one selected from the group consisting of a simple substance selected from the group consisting of a group 4 element, a group 5 element and a group 6 element of the periodic table, aluminum, silicon, cobalt and nickel, an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel and at least one element selected from the group consisting of nitrogen, carbon, boron and oxygen, and a solid solution derived from the compound,
  the cubic boron nitride grain having a carbon content of 0.08% by mass or less,
  the cubic boron nitride sintered material being a cubic boron nitride sintered material free of free carbon.

DETAILED DESCRIPTION

Problem to be Solved by the Present Disclosure

In recent years, in view of cost reduction, there is an increasing demand for high-efficiency machining for high-strength hardened steel. Accordingly, there is a demand for a cubic boron nitride sintered material also allowing a tool to have a long life even when the tool is used in high-efficiency machining for high-strength hardened steel.

Accordingly, an object of the present disclosure is to provide a cubic boron nitride sintered material that, when used as a material for a tool, allows the tool to have a long life even when it is used for high-efficiency machining for high-strength hardened steel.

Advantageous Effect of the Present Disclosure

When the presently disclosed cubic boron nitride sintered material is used as a material for a tool, the cubic boron nitride sintered material allows the tool to have a long life even when it is used for high-efficiency machining for high-strength hardened steel.

Summary of Embodiments

Initially, embodiments of the present disclosure will be listed and described.

(1) The presently disclosed cubic boron nitride sintered material comprises 30% by volume or more and 99.9% by volume or less of cubic boron nitride grains and 0.1% by volume or more and 70% by volume or less of a binder phase,
  the binder phase including:
    at least one selected from the group consisting of: a simple substance selected from the group consisting of a group 4 element, a group 5 element and a group 6 element of the periodic table, aluminum, silicon, cobalt and nickel; an alloy thereof; and an intermetallic compound thereof;
    at least one selected from the group consisting of: a compound consisting of at least one element selected from the group consisting of a group 4 element, a group 5 element and a group 6 element of the periodic table, aluminum, silicon, cobalt and nickel, and at least one element selected from the group consisting of nitrogen, carbon, boron and oxygen; and a solid solution derived from the compound; or
    at least one selected from the group consisting of a simple substance selected from the group consisting of a group 4 element, a group 5 element and a group 6 element of the periodic table, aluminum, silicon, cobalt and nickel, an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel and at least one element selected from the group consisting of nitrogen, carbon, boron and oxygen, and a solid solution derived from the compound, the cubic boron nitride grain having a carbon content of 0.08% by mass or less, the cubic boron nitride sintered material being a cubic boron nitride sintered material free of free carbon.

When the presently disclosed cubic boron nitride sintered material is used as a material for a tool, the cubic boron nitride sintered material allows the tool to have a long life even when it is used for high-efficiency machining for high-strength hardened steel.

(2) The cubic boron nitride grain preferably has a carbon content of 0.05% by mass or less. This allows a tool using the cubic boron nitride sintered material to have a longer tool life.

(3) The cubic boron nitride grain preferably has a carbon content of 0.035% by mass or less. This allows a tool using the cubic boron nitride sintered material to have a longer tool life.

(4) An interface between the cubic boron nitride grains preferably has a carbon content equal to or smaller than that of the cubic boron nitride grains. This allows a tool using the cubic boron nitride sintered material to have a longer tool life.

(5) The cubic boron nitride grain preferably has a calcium content of 0.02% by mass or more and 0.2% by mass or less. This allows a tool using the cubic boron nitride sintered material to have a longer tool life.

(6) The cubic boron nitride grain preferably has a calcium content of 0.05% by mass or more and 0.17% by mass or less. This improves the cubic boron nitride sintered material in strength and toughness at room temperature and high temperature.

(7) The cubic boron nitride grain preferably has a calcium content of 0.07% by mass or more and 0.15% by mass or less. This improves the cubic boron nitride sintered material in strength and toughness at room temperature and high temperature.

(6) The cubic boron nitride sintered material preferably comprises 45% by volume or more and 95% by volume or less of the cubic boron nitride grains. This allows a tool using the cubic boron nitride sintered material to have a longer tool life.

Detailed Description of Embodiments

Initially the present inventors have studied why a tool using a conventional cubic boron nitride sintered material has a reduced tool life when it is used in high-efficiency machining for high-strength hardened steel. As a result, the present inventors have found that the cubic boron nitride sintered material has insufficient thermal conductivity, and when the tool is used for high-efficiency machining for high-strength hardened steel, in particular, the temperature of and in a vicinity of a point of the tool in contact with the workpiece increases, which helps to cause crater wear resulting in a reduced tool life.

The present inventors have conducted more detailed studies on factors affecting the thermal conductivity of the cubic boron nitride sintered material. As a result, the present inventors have found that cubic boron nitride (cBN) grains' carbon content affects the thermal conductivity of the cubic boron nitride sintered material. Note that cubic boron nitride normally has a carbon content of approximately 0.1% by mass, which is a trace amount, and those skilled in the art have conventionally not paid attention to a relationship between cubic boron nitride grains' carbon content and tool life.

As a result of intensive studies based on the above findings, the present inventors have completed the presently disclosed cubic boron nitride sintered material.

Hereinafter, a specific example of the presently disclosed cubic boron nitride sintered material will be described. In the present specification, an expression in the form of "A to B" means a range's upper and lower limits (that is, A or more and B or less), and when A is not accompanied by any unit and B is alone accompanied by a unit, A has the same unit as B.

In the present specification, when a compound or the like is represented by a chemical formula without specifying any specific atomic ratio, it shall include any conventionally known atomic ratio and should not necessarily be limited to what falls within a stoichiometric range. For example, for "TiN," the ratio of the number of atoms constituting TiN includes any conventionally known atomic ratio.

<<Cubic Boron Nitride Sintered Material>>

A cubic boron nitride sintered material according to one embodiment of the present disclosure is a cubic boron nitride sintered material comprising 30% by volume or more and 99.9% by volume or less of cubic boron nitride grains and 0.1% by volume or more and 70% by volume or less of a binder phase, the binder phase including:

at least one selected from the group consisting of: a simple substance selected from the group consisting of a group 4 element, a group 5 element and a group 6 element of the periodic table, aluminum, silicon, cobalt and nickel; an alloy thereof; and an intermetallic compound thereof;

at least one selected from the group consisting of: a compound consisting of at least one element selected from the group consisting of a group 4 element, a group 5 element and a group 6 element of the periodic table, aluminum, silicon, cobalt and nickel, and at least one element selected from the group consisting of nitrogen, carbon, boron and oxygen; and a solid solution derived from the compound; or at least one selected from the group consisting of a simple substance selected from the group consisting of a group 4 element, a group 5 element and a group 6 element of the periodic table, aluminum, silicon, cobalt and nickel, an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel and at least one element selected from the group consisting of nitrogen, carbon, boron and oxygen, and a solid solution derived from the compound, the cubic boron nitride grain having a carbon content of 0.08% by mass or less, the cubic boron nitride sintered material being free of free carbon.

When the presently disclosed cubic boron nitride sintered material is used as a material for a tool, the cubic boron nitride sintered material allows the tool to have a long life even when it is used for high-efficiency machining for high-strength hardened steel, in particular. A reason for this is inferred as indicated by items (i) to (iv) below:

(i) The presently disclosed cubic boron nitride sintered material comprises 30% by volume or more and 99.9% by volume or less of cBN grains high in hardness, strength and toughness. For this reason, it is inferred that the cubic boron nitride sintered material has excellent wear resistance and excellent breakage resistance, and hence allows an extended tool life.

(ii) In the presently disclosed cubic boron nitride sintered material, the binder phase includes:

- at least one selected from the group consisting of: a simple substance selected from the group consisting of a group 4 element, a group 5 element and a group 6 element of the periodic table, aluminum, silicon, cobalt and nickel; an alloy thereof; and an intermetallic compound thereof;
- at least one selected from the group consisting of: a compound consisting of at least one element selected from the group consisting of a group 4 element, a group 5 element and a group 6 element of the periodic table, aluminum, silicon, cobalt and nickel, and at least one element selected from the group consisting of nitrogen, carbon, boron and oxygen; and a solid solution derived from the compound; or
- at least one selected from the group consisting of a simple substance selected from the group consisting of a group 4 element, a group 5 element and a group 6 element of the periodic table, aluminum, silicon, cobalt and nickel, an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel and at least one element selected from the group consisting of nitrogen, carbon, boron and oxygen, and a solid solution derived from the compound. The binder phase has a large force to bind to cBN grains. For this reason, it is inferred that the cubic boron nitride sintered material has excellent breakage resistance and hence allows an extended tool life.

(iii) The presently disclosed cubic boron nitride sintered material comprises cubic boron nitride grains having a carbon content of 0.08% by mass or less. When the cBN grain has a carbon content with an upper limit of 0.08% by mass, the cBN grain is enhanced in thermal conductivity. Accordingly, the cubic boron nitride sintered material comprising the cubic boron nitride grains is also enhanced in thermal conductivity. Therefore, even when a tool using the cubic boron nitride sintered material is used for high-efficiency machining for a high-strength hardened steel, the temperature of and in a vicinity of a point of the tool in contact with the workpiece is not easily increased, which suppresses crater wear and flank wear and it is thus inferred that an extended tool life is provided.

(iv) Carbon in cubic boron nitride grains is reactable with iron, and is a cause of impairing in wear resistance a tool using a cubic boron nitride sintered material. The presently disclosed cubic boron nitride sintered material comprises cubic boron nitride grains having a carbon content extremely reduced to 0.08% by mass or less, and it is thus inferred that wear attributed to a reaction between carbon in the cBN grains and iron in a workpiece is suppressed and an extended tool life is achieved.

(v) The presently disclosed cubic boron nitride sintered material is free of free carbon having a significantly low hardness as compared with cBN. It is thus inferred that the cubic boron nitride sintered material suppresses wear attributed to mechanical properties and allows an extended tool life.

While in the above description the tool using the presently disclosed cubic boron nitride sintered material has a long tool life in high-efficiency machining for a high-strength hardened steel, the workpiece is not limited thereto. Examples of the workpiece include chromium molybdenum steel (SCM415), chromium steel material (SCr415), carbon steel for machine structure (S50C), high carbon chromium bearing steel material (SUJ2) and the like.

(Composition of Cubic Boron Nitride Sintered Material)

The presently disclosed cubic boron nitride sintered material comprises 30% by volume or more and 99.9% by volume or less of cubic boron nitride grains and 0.1% by volume or more and 70% by volume or less of a binder phase. Note that the cBN sintered material may comprise inevitable impurities resulting from raw materials, manufacturing conditions, and the like.

The cBN sintered material preferably contains cBN grains at a ratio with a lower limit of 30% by volume, preferably 40% by volume, more preferably 45% by volume. The cBN sintered material contains cBN grains at the ratio with an upper limit of 99.9% by volume, preferably 95% by volume, more preferably 90% by volume. The cBN sintered material contains cBN grains at a ratio of 30% by volume or more and 99.9% by volume or less, preferably 40% by volume or more and 95% by volume or less, more preferably 45% by volume or more and 95% by volume or less.

The cBN sintered material contains a binder phase at a ratio with a lower limit of 0.1% by volume, preferably 5% by volume, more preferably 10% by volume. The cBN sintered material contains the binder phase at the ratio with an upper limit of 70% by volume, preferably 60% by volume, more preferably 55% by volume. The cBN sintered material contains the binder phase at a ratio of 0.1% by volume or more and 70% by volume or less, preferably 5% by volume or more and 60% by volume or less, more preferably 5% by volume or more and 55% by volume or less.

The cBN sintered material's cBN grain content ratio (vol %) and binder phase content ratio (vol %) can be confirmed by subjecting the cBN sintered material to structural observation, elemental analysis, and the like by using an energy dispersive X-ray analyzer (EDX) (Octan Elect EDS system) accompanying a scanning electron microscope (SEM) ("JSM-7800F" (trade name) manufactured by JEOL Ltd.). The content ratios are specifically measured in the following method.

Initially, the cBN sintered material is cut at a desired part to prepare a sample including a cross section of the cBN sintered material. The cross section can be prepared using a focused ion beam device, a cross section polisher, or the like. Subsequently, the cross section is observed with an SEM with a magnification of 5,000 times to obtain a backscattered electron image. In the backscattered electron image, a region where cBN grains are present will be a black region and a region where the binder phase is present will be a gray region or a white region.

Subsequently, the backscattered electron image is binarized using image analysis software ("WinROOF" by Mitani Corporation). From the binarized image, an area ratio of pixels that are attributed to a dark field (i.e., pixels attributed to cBN grains) in the area of a field of view for measurement is calculated. The calculated area ratio can be regarded as a value in % by volume, and a cBN grain content ratio (vol %) can thus be obtained.

From the binarized image, an area ratio of pixels that are attributed to a bright field (i.e., pixels attributed to the binder phase) in the area of the field of view for measurement can be calculated to obtain a binder phase content ratio (vol %).

As measured by the applicant, it has been confirmed that insofar as the cBN sintered material's cBN grain content ratio (vol %) and binder phase content ratio (vol %) are measured in the same sample, even changing a location where a field of view for measurement is selected and thus performing calculation for a plurality of times provide measurement results without substantial variation and thus there is no arbitrariness even with a field of view set, as desired, for measurement.

By confirming (i) from a result of an elemental mapping through SEM-EDX, as above, that B and N exist in the dark field, and (ii) by subjecting the cBN sintered material to X-ray diffraction measurement, that the cBN sintered material has a cubic structure, it can be seen that pixels attributed to the dark field are attributed to cBN grains. This is specifically measured as follows:

The cubic boron nitride sintered material is cut with a diamond grindstone electrodeposition wire, and the cut surface serves as an observation surface.

An X-ray spectrum of the cut surface of the cBN is obtained using an X-ray diffractometer ("MiniFlex600" (trade name) manufactured by Rigaku Corporation). In doing so, the X-ray diffractometer is set in the following conditions:

Characteristic X-ray: Cu-Kα (wavelength: 1.54 angstrom)
Tube voltage: 45 kV
Tube current: 40 mA
Filter: Multi-layer mirror
Optical system: Focusing method
X-ray diffractometry: θ-2θ method In the obtained X-ray spectrum, two peaks around diffraction angles 2θ of 43.3° and 2θ of 50.3° are attributed to cBN grains. Accordingly, by confirming that there are peaks around diffraction angles 2θ of 43.3° and 2θ of 50.30, together with the result of the mapping through SEM-EDX, it can be confirmed that a pixel attributed to a dark field is attributed to a cBN grain.

(Free Carbon)

The presently disclosed cubic boron nitride sintered material is free of free carbon. The free carbon includes the following forms (i) and (ii):

(i) carbon present in a sintered material as a simple substance of carbon as a carbon component such as an organic substance is added before sintering and is carbonized during sintering; and (ii) carbon present in a sintered material as a simple substance of carbon even when no carbon component is added, as a carbon component contained in a powdery mixture is degassed or separated during sintering.

A cBN sintered material free of free carbon further suppresses wear attributed to a reaction with iron. Further, free carbon is of significantly low hardness as compared with cBN. Therefore, the presently disclosed cBN sintered material free of free carbon can also suppress wear attributed to mechanical properties. These provides a synergetic effect to allow a tool using the cBN sintered material to have a long tool life.

In the present specification, the fact that the cubic boron nitride sintered material is free of free carbon is confirmed in the following method:

When the CBN sintered material is dissolved in $H_2O_2$+HCl, the former substantially dissolves in the latter except for free carbon. Free carbon can be separated by filtering the solution. Through the filtration a powdery matter is obtained, and the powdery matter is analyzed in a non-dispersive infrared absorption method RC612 (by LECO) for how much amount of free carbon the powdery matter has.

As a result of the above measurement, when the carbon content is equal to or less than a detection limit (of 0.001% by mass), it is confirmed that the cubic boron nitride sintered material is free of free carbon.

(Inevitable Impurities)

The presently disclosed cubic boron nitride sintered material may comprise inevitable impurities within a range showing the effect of the present disclosure. Examples of the inevitable impurities include hydrogen, oxygen, carbon, alkali metal elements (lithium (Li), sodium (Na), potassium (K), and the like), alkaline earth metal elements (calcium (Ca), magnesium (Mg), and the like), and other similar metal elements. When the cubic boron nitride sintered material comprises inevitable impurities, the inevitable impurities are preferably contained in an amount of 0.01% by mass or less. The content of the inevitable impurities can be measured through secondary ion mass spectrometry (SIMS).

<<Cubic Boron Nitride Grains>>

(Carbon Content)

The presently disclosed cubic boron nitride sintered material comprises cubic boron nitride grains having a carbon content of 0.08% by mass or less. This improves the cubic boron nitride sintered material in thermal conductivity and achieves an extended tool life. Furthermore, it suppresses wear attributed to a reaction between carbon in the cBN grains and iron in a workpiece and provides an extended tool life. Note that carbon means any carbon contained in the cBN sintered material, and as a concept includes the free carbon described above.

The cubic boron nitride grains have a carbon content with an upper limit preferably of 0.08% by mass, more preferably 0.05% by mass, still more preferably 0.035% by mass. The cubic boron nitride grains preferably have the carbon content with a lower limit of 0.01% by mass in view of production. The cubic boron nitride grains have a carbon content preferably of 0.01% by mass or more and 0.08% by mass or less, more preferably 0.01% by mass or more and 0.05% by mass or less, still more preferably 0.01% by mass or more and 0.035% by mass or less.

The carbon content of the cubic boron nitride grains is measured in the following method:

Initially, a sample of the cubic boron nitride sintered material is introduced into a container and sealed therein, and in the container the sample is immersed in fluoronitric acid (hydrofluoric acid:nitric acid=1:1, which is a ratio in volume) at 140° C. for 48 hours. As a result, the binder phase completely dissolves in the fluoronitric acid, and the cBN grains remain alone. A carbon analyzer ("CS744" (trademark) manufactured by LECO JAPAN CORPORATION) is used to measure the cBN grains' carbon content quantitatively.

(Calcium Content)

The presently disclosed cubic boron nitride sintered material preferably comprises cubic boron nitride grains including 0.02% by mass or more and 0.2% by mass or less of calcium. When the cBN grains include calcium, the cBN grains have reduced atomic vacancies and hence per se have increased strength and toughness at room temperature and high temperature, and a tool using the cubic boron nitride sintered material has a further extended tool life.

The cubic boron nitride grains have a calcium content with an upper limit preferably of 0.2% by mass, more preferably 0.17% by mass, still more preferably 0.15% by mass. The cubic boron nitride grains have the calcium content with a lower limit of 0.02% by mass, preferably 0.17% by mass, more preferably 0.07% by mass. The cubic boron nitride grains have a calcium content preferably of 0.02% by mass or more and 0.2% by mass or less, more preferably 0.05% by mass or more and 0.17% by mass or less, still more preferably 0.07% by mass or more and 0.15% by mass or less.

The calcium content of the cubic boron nitride grains is measured in the following method:

Initially, a sample of the cubic boron nitride sintered material is introduced into a container and sealed therein, and in the container the sample is immersed in fluoronitric acid (hydrofluoric acid:nitric acid=1:1, which is a ratio in volume) at 140° C. for 48 hours. As a result, the binder phase completely dissolves in the fluoronitric acid, and the cBN grains remain alone. The cBN grains are subjected to high-frequency inductively coupled plasma-atomic emission spectroscopy (ICP) (with a measurement instrument: ICPS-8100 (trademark) manufactured by Shimadzu Corporation) to quantitatively measure the calcium content of the cBN grains.

(Median Diameter d50)

A median diameter d50 in equivalent circular diameter of the cubic boron nitride grains included in the presently disclosed cubic boron nitride sintered material (hereinafter also simply referred to as "median diameter d50") is preferably 1 nm or more and 30,000 nm or less, more preferably 10 nm or more and 15,000 nm or less. This allows a tool using the cubic boron nitride sintered material to have a long tool life.

In the present specification, a median diameter d50 in equivalent circular diameter of cubic boron nitride grains is determined as follows: at each of five measurement points selected as desired, a median diameter d50 of a plurality of cubic boron nitride grains is measured and an average of such median diameters d50 obtained at the five measurement points is calculated to obtain the median diameter d50 in equivalent circular diameter of the cubic boron nitride grains. It is specifically measured in the following method:

When the cubic boron nitride sintered material is used as a part of a tool, the portion of the cubic boron nitride sintered material is cut out by a diamond grindstone electrodeposition wire or the like, the cross section cut out is polished, and five measurement points are set on the polished surface as desired.

The polished surface is observed at each measurement point with a SEM ("JSM-7500F" (trade name) manufactured by JEOL Ltd.) to obtain a SEM image. The measurement is done in a field of view having a size of 12 μm×15 μm, and the observation is done at a magnification of 10,000 times.

For each of the five SEM images, in a state where cubic boron nitride grains observed within the field of view for measurement have their grain boundaries separated, image processing software (Win ROOF of MITANI CORPORATION) is used to calculate how each cubic boron nitride grain is distributed in equivalent circular diameter.

From the distribution in equivalent circular diameter of cubic boron nitride grains, a median diameter d50 for each measurement point is calculated, and an average of the median diameters d50 obtained at the measurement points is calculated. The average value corresponds to the median diameter d50 in equivalent circular diameter of the cubic boron nitride grains.

Note that, as measured by the applicant, it has been confirmed that insofar as cubic boron nitride grains' median diameter d50 is measured in the same sample, while a location in the cubic boron nitride sintered material where a field of view for measurement is selected is changed and calculation is thus performed for a plurality of times, measurement results are obtained without substantial variation and there is no arbitrariness even with a field of view set, as desired, for measurement.

(Carbon Content in Grain Boundary Between Cubic Boron Nitride Grains)

In the presently disclosed cubic boron nitride sintered material, a carbon content at an interface between the cubic boron nitride grains is preferably equal to or smaller than that of the cubic boron nitride grains. This allows a tool using the cubic boron nitride sintered material to have a longer tool life. It is inferred that this is achieved for the following grounds (a) to (c):

(a) Carbon present at an interface between cubic boron nitride grains exists as a simple substance of carbon (such as graphite). That carbon is of significantly low hardness as compared with cBN. It is thus inferred that when the interface between the cBN grains has a low carbon content, wear attributed to mechanical properties accompanying reduced hardness is suppressed and an extended tool life is achieved.

(b) Carbon present at an interface between cubic boron nitride grains is reactable with iron. It is thus inferred that when the interface between the cBN grains has a low carbon content, wear attributed a reaction of carbon with iron in a workpiece is suppressed and an extended tool life is achieved.

(c) When carbon is present at an interface between cubic boron nitride grains, a bonding force between the cBN grains tends to decrease. It is thus inferred that when the interface between the cBN grains has a low carbon content, reduction in the bonding force between the cBN grains is suppressed, the cBN sintered material's wear resistance is enhanced, and an extended tool life is achieved.

A carbon content at an interface between the cubic boron nitride grains that is equal to or smaller than that of the cubic boron nitride grains is measured through the following procedure of steps (1) to (3).

(1) A sample is obtained from the cBN sintered material and sliced to have a thickness of 30 to 100 nm using an argon ion slicer to prepare a section.

(2) The section prepared in step (1) is observed with a transmission electron microscope (hereinafter also referred to as "TEM." Device: "JEM-2100F/Cs (trademark) manufactured by JEOL) at a magnification of 300,000 times, and an elemental mapping analysis is performed through energy dispersive X-ray spectroscopy (EDX) accompanying the TEM. A grain in which boron (B) and nitrogen (N) are present is regarded as a cBN grain, and a location where cBN grains are in contact with each other (that is, an interface between the cBN grains) is arbitrarily selected at 10 points.

(3) The interface between the cBN grains is subjected to an elemental analysis of carbon by line scan perpendicularly. The line scan is performed in a range set to include the interface and two cBN grains forming the interface.

(4) When at seven or more of the ten points selected above, an amount of carbon at an interface between cBN grains is equal to or less than a maximum value in the range in which the line scan is performed, it is determined that the carbon content at the interface between the cBN grains is equal to or smaller than that in the cubic boron nitride grains.

As measured by the applicant, it has been confirmed that insofar as carbon content is measured in the same sample, while a location where a field of view for measurement is selected is changed and calculation is thus performed for a plurality of times, measurement results are obtained without substantial variation and there is no arbitrariness even with the field of view set, as desired, for measurement.

<<Binder Phase>>

The binder phase plays a role in making cBN particles, which are a difficult-to-sinter material, sinterable at industrial-level pressure and temperature. Furthermore, the binder phase has a lower reactivity with iron than cBN, and thus additionally acts to suppress chemical wear and thermal wear in cutting of high-hardness hardened steel. In addition, when a cBN sintered material contains the binder phase, it enhances wear resistance in high-efficiency machining for high-hardness hardened steel.

The presently disclosed cBN sintered material comprises a binder phase that includes:

at least one selected from the group consisting of a simple substance selected from the group consisting of a group 4 element, a group 5 element and a group 6 element of the periodic table, aluminum, silicon, cobalt and nickel (hereinafter also referred to as "the group A"), an alloy thereof, and an intermetallic compound thereof;

at least one selected from the group consisting of: a compound consisting of at least one element selected from the group consisting of a group 4 element, a group 5 element and a group 6 element of the periodic table, aluminum, silicon, cobalt and nickel (or the group A) and at least one element selected from the group consisting of nitrogen, carbon, boron and oxygen (hereinafter also referred to as "the group B"); and a solid solution derived from the compound; or at least one selected from the group consisting of a simple substance selected from the group consisting of a group 4 element, a group 5 element and a group 6 element of the periodic table, aluminum, silicon, cobalt and nickel (or the group A), an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel (or the group A) and at least one element selected from the group consisting of nitrogen, carbon, boron and oxygen (or the group B), and a solid solution derived from the compound. That is, the binder phase can be in any of the following forms (a) to (f):

(a) The binder phase consists of at least one of a simple substance, an alloy, and an intermetallic compound of the group A.

(b) The binder phase includes at least one of a simple substance, an alloy, and an intermetallic compound of the group A.

(c) The binder phase consists of at least one selected from the group consisting of a compound consisting of at least one element selected from the group A and at least one element selected from the group B, and a solid solution derived from the compound.

(d) The binder phase includes at least one selected from the group consisting of a compound consisting of at least one element selected from the group A and at least one element selected from the group B, and a solid solution derived from the compound.

(e) The binder phase consists of at least one selected from the group consisting of at least one of a simple substance, an alloy, and an intermetallic compound of the group A, and a compound consisting of at least one element selected from the group A and at least one element selected from the group B and a solid solution derived from the compound.

(f) The binder phase includes at least one selected from the group consisting of at least one of a simple substance, an alloy, and an intermetallic compound of the group A, and a compound consisting of at least one element selected from the group A and at least one element selected from the group B and a solid solution derived from the compound.

The group 4 element of the periodic table includes titanium (Ti), zirconium (Zr) and hafnium (Hf) for example. The group 5 element of the periodic table includes vanadium (V), niobium (Nb) and tantalum (Ta) for example. The group 6 element of the periodic table includes chromium (Cr), molybdenum (Mo) and tungsten (W) for example. Hereinafter, the group 4 element, the group 5 element, the group 6 element, aluminum, silicon, cobalt, and nickel will also be referred to as a "first metal element."

Examples of the alloy of the first metal element include Ti—Zr, Ti—Hf, Ti—V, Ti—Nb, Ti—Ta, Ti—Cr, and Ti—Mo. Examples of the intermetallic compound of the first metal element include $TiCr_2$, $Ti_3Al$ and Co—Al.

Examples of the compound including the first metal element and nitrogen (i.e., a nitride) include titanium nitride (TiN), zirconium nitride (ZrN), hafnium nitride (HfN), vanadium nitride (VN), niobium nitride (NbN), tantalum nitride (TaN), chromium nitride ($Cr_2N$), molybdenum nitride (MoN), tungsten nitride (WN), aluminum nitride (AlN), silicon nitride ($Si_3N_4$), cobalt nitride (CoN), nickel nitride (NiN), titanium zirconium nitride (TiZrN), titanium hafnium nitride (TiHfN), titanium vanadium nitride (TiVN), titanium niobium nitride (TiNbN), titanium tantalum nitride (TiTaN), titanium chromium nitride (TiCrN), titanium molybdenum nitride (TiMoN), titanium tungsten nitride (TiWN), titanium aluminum nitride (TiAlN, $Ti_2AlN$, $Ti_3AlN$), zirconium hafnium nitride (ZrHfN), zirconium vanadium nitride (ZrVN), zirconium niobium nitride (ZrNbN), zirconium tantalum nitride (ZrTaN), zirconium chromium nitride (ZrCrN), zirconium molybdenum nitride (ZrMoN), zirconium tungsten nitride (ZrWN), hafnium vanadium nitride (HfVN), hafnium niobium nitride (HfNbN), hafnium tantalum nitride (HfTaN), hafnium chromium nitride (HfCrN), hafnium molybdenum nitride (HfMoN), hafnium tungsten nitride (HfWN), vanadium niobium nitride (VNbN), vanadium tantalum nitride (VTaN), vanadium chromium nitride (VCrN), vanadium molybdenum nitride (VMoN), vanadium tungsten nitride (VWN), niobium tantalum nitride (NbTaN), niobium chromium nitride (NbCrN), niobium molybdenum nitride (NbMoN), niobium tungsten nitride (NbWN), tantalum chromium nitride (TaCrN), tantalum molybdenum nitride (TaMoN), tantalum tungsten nitride (TaWN), chromium molybdenum nitride (CrMoN), chromium tungsten nitride (CrWN), and molybdenum chromium nitride (MoWN).

Examples of the compound including the first metal element and carbon (i.e., a carbide) include titanium carbide (TiC), zirconium carbide (ZrC), hafnium carbide (HfC), vanadium carbide (VC), niobium carbide (NbC), tantalum carbide (TaC), chromium carbide ($Cr_3C_2$), molybdenum carbide (MoC), tungsten carbide (WC), silicon carbide (SiC), and tungsten-cobalt carbide ($W_2Co_3C$).

Examples of the compound including the first metal element and boron (i.e., a boride) include titanium boride ($TiB_2$), zirconium boride ($ZrB_2$), hafnium boride ($HfB_2$), vanadium boride ($VB_2$), niobium boride ($NbB_2$), tantalum boride ($TaB_2$), chromium boride (CrB), molybdenum boride (MoB), tungsten boride (WB), aluminum boride ($AlB_2$), cobalt boride ($Co_2B$), and nickel boride ($Ni_2B$).

Examples of the compound including the first metal element and oxygen (i.e., an oxide) include titanium oxide ($TiO_2$), zirconium oxide ($ZrO_2$), hafnium oxide ($HfO_2$), vanadium oxide ($V_2O_5$), niobium oxide ($Nb_2O_5$), tantalum oxide ($Ta_2O_5$), chromium oxide ($Cr_2O_3$), molybdenum oxide ($MoO_3$), tungsten oxide ($WO_3$), aluminum oxide ($Al_2O_3$), silicon oxide ($SiO_2$), cobalt oxide (CoO), and nickel oxide (NiO).

Examples of the compound including the first metal element, carbon and nitrogen (i.e., a carbonitride) include titanium carbonitride (TiCN), zirconium carbonitride (ZrCN), hafnium carbonitride (HfCN), titanium niobium carbonitride (TiNbCN), titanium zirconium carbonitride (TiZrCN), titanium tantalum carbonitride (TiTaCN), titanium hafnium carbonitride (TiHfCN), and titanium chromium carbonitride (TiCrCN).

Examples of the compound including the first metal element, oxygen, and nitrogen (i.e., an oxynitride) include titanium oxynitride (TiON), zirconium oxynitride (ZrON), hafnium oxynitride (HfON), vanadium oxynitride (VON), niobium oxynitride (NbON), tantalum oxynitride (TaON), chromium oxynitride (CrON), molybdenum oxynitride (MoON), tungsten oxynitride (WON), aluminum oxynitride (AlON), and silicon oxynitride (SiAlON).

The solid solution derived from the compound as above means a state in which two or more types of these compounds are dissolved in each other's crystal structure, and means an interstitial solid solution, a substitutional solid solution or the like.

The above compound may be one type of compound or two or more types of compounds in combination.

The binder phase may include a component other than the binder phase compound. Examples of an element constituting the other component can include manganese (Mn), rhenium (Re), iron (Fe), and cobalt (Co).

The composition of the binder phase included in the cBN sintered material can be determined for example by combining tissue observation, elemental analysis and the like using an energy dispersive X-ray analyzer (EDX) ("Octan Elect EDS system" manufactured by EDAX) accompanying a scanning electron microscope (SEM) ("JSM-7800F" (trademark) manufactured by JEOL Ltd.) with crystal structure analysis or the like through XRD (X-ray diffraction measurement, X-ray diffraction).

<Applications>

The presently disclosed cubic boron nitride sintered material is suitably applied to cutting tools, wear resistant tools, grinding tools, and the like.

The cutting, wear resistant and grinding tools using the presently disclosed cubic boron nitride sintered material may entirely be composed of the cubic boron nitride sintered material or may only have a portion (e.g., a cutting edge for a cutting tool) composed of the cubic boron nitride sintered material. Furthermore, a coating film may be formed on a surface of each tool.

The cutting tool can include drills, end mills, indexable cutting inserts for drills, indexable cutting inserts for end mills, indexable cutting inserts for milling, indexable cutting inserts for turning, metal saws, gear cutting tools, reamers, taps, a cutting bite, and the like.

The wear resistant tool can include dies, scribers, scribing wheels, and dressers, and the like. The grinding tool can include grinding stone and the like.

<<Method for Manufacturing Cubic Boron Nitride Sintered Material>>

The presently disclosed cubic boron nitride sintered material can be manufactured for example in the following method:

Initially, cubic boron nitride powder (hereinafter also referred to as cBN powder) and binder powder are prepared.

The cBN powder is a raw material powder for cBN grains included in the cBN sintered material. The cBN powder is not particularly limited, and can be a known cBN powder. Inter alia, the cBN powder is preferably obtained by holding hexagonal boron nitride powder in the presence of catalytic $LiCaBN_2$ for a period of time at a temperature and a pressure falling within a range in which cubic boron nitride is thermodynamically stable, and thus converting the hexagonal boron nitride powder into cubic boron nitride powder. In doing so, the period of time for which the hexagonal boron nitride powder is held at a temperature and a pressure falling within the range in which cubic boron nitride is thermodynamically stable, can be adjusted to adjust a calcium content in the cBN grains.

The cBN powder's $D_{50}$ (or average grain diameter) is not particularly limited, and can for example be 0.1 to 12.0 μm.

The cBN powder is subjected to heat treatment in a reducing atmosphere such as $NH_3$. The present inventors have found that cubic boron nitride grains thus subjected to heat treatment in a reducing atmosphere can have a reduced carbon content. For example, the cBN powder is subjected to heat treatment at 500° C. to 1500° C. for 15 minutes to 240 minutes in an $NH_3$ atmosphere. This reduces the cBN powder's carbon content to 0.08% by mass or less.

Furthermore, the present inventors have found that while subjecting the cubic boron nitride grains to heat treatment at an increased temperature decreases the cBN grains' carbon content, doing so converts cubic boron nitride into hexagonal boron nitride, which leads to reduction in wear resistance of the cBN sintered material. In view of the above, the present inventors have conducted intensive studies, and as a result found that reducing the cubic boron nitride grains' carbon content to 0.001% by mass or more and 0.08% by mass or less does not require applying excessive heat treatment to the cBN grains, so that cubic boron nitride is not converted into hexagonal boron nitride and the cBN sintered material can have excellent wear resistance. Thus, the cubic boron nitride grains' carbon content is preferably 0.001% by mass or more and 0.08% by mass or less.

The binder powder is a powdery raw material for the binder phase included in the cBN sintered material. The binder powder can be prepared, for example, as follows: Initially a compound is prepared that consists of: at least one element selected from the group consisting of a group 4 element, a group 5 element and a group 6 element of the periodic table, aluminum, silicon, cobalt and nickel; and at least one element selected from the group consisting of nitrogen, carbon, boron and oxygen. The compound may be one type of compound or two or more types of compounds in combination.

The above compound is agitated and pulverized to prepare the binder powder. While the compound is agitated and pulverized in any method, a ball mill, a jet mill or the like is preferably used in view of efficient and homogeneous agitation. The compound may be agitated and pulverized in a wet manner or a dry manner.

The cBN powder and binder powder prepared as described above are mixed together by wet ball mill-mixing using ethanol, acetone or the like as a solvent to prepare a powdery mixture. The solvent is removed by air-drying after the mixing. Subsequently, a heat treatment is performed to volatilize impurities such as moisture adsorbed on the surface of the powdery mixture and thus clean the surface of the powdery mixture.

The above powdery mixture is brought into contact with a WC-6% Co cemented carbide disc and a Co (cobalt) foil and thus introduced into a container made of Ta (tantalum), and the container is vacuumed and sealed. The powdery mixture in the vacuumed and sealed container is sintered using a belt-type ultrahigh-pressure and ultrahigh-temperature generator at 3 to 9 GPa and 1100 to 1900° C. for 5 to 60 minutes.

The presently disclosed cubic boron nitride sintered material is thus manufactured.

EXAMPLES

The present embodiment will be described more specifically with reference to examples. Note, however, that the present embodiment is not limited to these examples.

Example 1

(Sample 1-1)

100 parts by mass of hexagonal boron nitride powder were blended with 10 parts by mass of $LiCaBN_2$ serving as a catalyst, and the mixture was held at 5 GPa and 1450° C. for 30 minutes to obtain cubic boron nitride powder (cBN powder).

The above cBN powder was subjected to heat treatment in an $NH_3$ atmosphere (under the atmospheric pressure) at 700° C. for 3 hours.

WC powder, Co powder and Al powder were prepared at a ratio in volume of 3:8:1. To the WC powder, the Co powder, and the Al powder, Zr powder was added and mixed so as to be 5% by mass of the total, heat-treated at 1200° C. for 30 minutes in a vacuum, and thereafter agitated and pulverized with a wet ball mill to obtain a binder powder. Note that $Al_2O_3$ shown in Table 1 is obtained as the Al reacts with oxygen that is contained in the powdery mixture while sintered.

After the heat treatment, the cBN powder and the binder powder were blended at a ratio in volume of 95:5 and uniformly mixed in a wet ball mill method using ethanol to obtain a powdery mixture. Subsequently, the powdery mixture was degassed in a vacuum at 900° C. to remove impurities such as moisture on the surface thereof.

Subsequently, the powdery mixture was brought into contact with a WC-6% Co cemented carbide disc and a Co (cobalt) foil and thus introduced into a container made of Ta (tantalum), and the container was vacuumed and sealed. Using a belt-type ultrahigh-pressure and ultrahigh-temperature generator, the powdery mixture in the vacuumed and sealed container was held at 7 GPa and 1700° C. for 15 minutes and thus sintered to provide a cBN sintered material for sample 1-1.

(Sample 1-2 to Sample 1-6)

cBN sintered materials were produced in the same manner as in sample 1-1 except that the cBN powder was subjected to heat treatment under conditions indicated in table 1.

(Sample 1-7 to Sample 1-12)

cBN sintered materials were produced in the same manner as in sample 1-5 except that in producing the cBN powder, a holding time at 5 GPa and 1450° C. was changed to those indicated in table 1.

(Sample 1-13)

A cBN sintered material was produced in the same manner as in sample 1-5 except that in producing the binder powder, Cr powder was added instead of Zr powder.

(Sample 1-14)

A cBN sintered material was produced in the same manner as in sample 1-5 except that in producing the binder powder, Ni powder and Nb powder were added instead of Zr powder. The mass ratio of the Ni powder and the Nb powder was Ni:Nb=1:1.

(Sample 1-15)

A cBN sintered material was produced in the same manner as in sample 1-5 except that Zr powder was not added in producing the binder powder and ZrN powder was added in mixing the cBN powder and the binder powder. The ZrN powder was added in an amount of 5% by mass with respect to the amount of the binder.

(Sample 1-16)

A cBN sintered material was produced in the same manner as in sample 1-5 except that Zr powder was not added in producing the binder powder and CrN powder was added in mixing the cBN powder and the binder powder. The CrN powder was added in an amount of 5% by mass with respect to the amount of the binder.

(Sample 1-17)

A cBN sintered material was produced in the same manner as in sample 1-16 except that the powdery mixture was sintered with a pressure of 10 GPa applied.

(Sample 1-18)

A cBN sintered material was produced in the same manner as in sample 1-16, except that a ratio in volume of the cBN powder and the binder powder was set to 90:10 and the powdery mixture was sintered with a pressure of 6.5 GPa applied.

(Sample 1-19)

A cBN sintered material was produced in the same manner as in sample 1-16, except that a ratio in volume of the cBN powder and the binder powder was set to 90:10 and the powdery mixture was sintered with a pressure of 5.5 GPa applied.

(Sample 1-20)

A cBN sintered material was produced in the same manner as in sample 1-16, except that the powdery mixture was sintered with a pressure of 15 GPa applied.

(Sample 1-21)

A cBN sintered material was produced in the same manner as in sample 1-5 except that the cBN powder was not subjected to heat treatment.

(Sample 1-22)

A cBN sintered material was produced in the same manner as in sample 1-5 except that $LiBN_2$ was used instead of $LiCaBN_2$ in producing the cBN powder.

(Sample 1-23)

A cBN sintered material was produced in the same manner as in sample 1-5 except that the cBN powder was subjected to heat treatment at 900° C. for 10 hours.

(Sample 1-24)

A cBN sintered material was produced in the same manner as in sample 1-5 except that the binder powder was not used and the cBN powder was alone sintered, and in doing so, the WC-6% Co cemented carbide disc and the Co (cobalt) foil were not used.

(Sample 1-25)

A cBN sintered material was produced in the same manner as in sample 1-5 except that the binder powder was not used and the cBN powder was alone sintered, and in doing so, the WC-6% Co cemented carbide disc and the Co (cobalt) foil were replaced with an Al plate.

(Sample 1-26)

A cBN sintered material was produced in the same manner as in sample 1-5 except that in mixing the cBN powder and the binder powder together, a general, anionic dispersant ("SN Dispersant 5023" (trademark) manufactured by SAN NOPCO LIMITED) was added and mixed in an amount of 2% by mass with respect to the mass of the powdery mixture.

(Sample 1-27)

Sample 1-27 was basically produced in the same manner as sample 1-5. It is different from sample 1-5, as follows:

The binder powder was obtained by mixing Co powder, Al powder and Cr powder at a weight ratio of Co powder:Al powder:Cr powder=7.5:1:0.5.

The cBN powder and the binder powder were blended at a ratio in volume of cBN powder:binder powder=90:10 and uniformly mixed in a wet ball mill method using ethanol to obtain a powdery mixture. Subsequently, the powdery mixture was degassed in a vacuum at 900° C. to remove impurities such as moisture on the surface thereof.

The powdery mixture was sintered without using the WC-6% Co cemented carbide disc to obtain a cBN sintered material for sample 1-27. When the powdery mixture was sintered, Co, Al and Cr in the binder powder each form a solid solution and thus form a CoCrAl alloy.

(Sample 1-28)

A cBN sintered material was produced in the same manner as in sample 1-5 except that in mixing the binder powder and the cBN powder, an organic matter of dodecanamine ($CH_3(CH_2)_{11}NH_2$) was added at a weight ratio of 0.05%.

<Evaluation>

(Composition of cBN Sintered Material)

The ratio in volume between the cBN grains and the binder phase in the cBN sintered material was measured. How it was specifically measured will not be described as it is identical to that described in an embodiment for implementing the present invention, as has been described above. A result is shown in table 1 at the "cBN grains (vol %)" and "binder phase (vol %)" columns.

In sample 1-1 to sample 1-16, sample 1-18 to sample 1-23, and sample 1-25, a ratio in volume of the cBN powder and the binder powder in the powdery mixture and a ratio in volume of the cBN grains and the binder phase in the cubic boron nitride sintered material were different. It is believed that this is because the powdery mixture is sintered in contact with the WC-6% Co cemented carbide disc, and accordingly, while the powdery mixture is sintered, the cemented carbide component flows into the powdery mixture, and in the resultant cBN sintered material, that cemented carbide component is present as a binder phase.

(Composition of Binder Phase)

The composition of the binder phase in the cBN sintered material was determined. How it was specifically determined will not be described as it is identical to that described in an embodiment for implementing the present invention, as has been described above. A result is shown in Table 1 at the "binder phase" column at the "composition" sub column.

(Carbon Content)

The carbon content of the cBN grains in the cBN sintered material was measured with a carbon analyzer. How it was specifically measured will not be described as it is identical to that described in an embodiment for implementing the present invention, as has been described above. A result is indicated in Table 1 at the "cBN grain's carbon content" column.

(Calcium Content)

The calcium content of the cBN grains in the cBN sintered material was measured through an ICP analysis. How it was specifically measured will not be described as it is identical to that described in an embodiment for implementing the present invention, as has been described above. A result is indicated in Table 1 at the "cBN grain's Ca content" column.

(Free Carbon Concentration)

The free carbon concentration in the cBN sintered material was measured. How it was specifically measured will not be described as it is identical to that described in an embodiment for implementing the present invention, as has been described above. A result is indicated in table 1 at the "free carbon" column. In the table, "none" indicates that the free carbon concentration is equal to or lower than the detection limit and free carbon is thus absent.

(Carbon Content in Grain Boundaries Between Cubic Boron Nitride Grains)

In the cBN sintered material, a carbon content in grain boundaries between the cBN grains and a carbon content in the cBN grains were measured to determine a relationship in magnitude therebetween. How it was specifically measured and determined will not be described as it is identical to that described in the "Carbon content in grain boundaries between cubic boron nitride grains" section according to an embodiment for implementing the present invention, as has been described above. A result is indicated in table 1 at the "carbon content determined" column. In the table, "equal" means that at seven or more of ten points, an amount of carbon at an interface between cBN grains is equal to or less than a maximum value in a range in which line scan is performed, and the carbon content at the interface between the cBN grains is equal to or smaller than that in the cBN grains. In the table, "intra-grain<interface" means that at six or less of ten points, an amount of carbon at an interface between cBN grains is equal to or less than a maximum value in a range in which line scan is performed, and the carbon content at the interface between the cBN grains is larger than that in the cBN grains.

(Cutting Test)

The cBN sintered material of each sample produced was used as a cutting edge to produce a cutting tool (with a substrate having a shape: CNGA120408, and cutting-edge treatment: T01215). Using this, a cutting test was performed under cutting conditions indicated below: The following cutting conditions correspond to high-efficiency machining for high-strength hardened steel.

Cutting speed: 200 m/min
Feed rate: 0.1 mm/rev
Depth of cut: 0.1 mm
Coolant: (Dry)
Cutting method: continuous end face cutting
Lathe: LB400 (manufactured by Okuma Corporation)
Workpiece: cylindrical sintered part ("Hardened Sintered Alloy D-40" manufactured by Sumitomo Electric Industries, Ltd.)

Evaluation Method: The cutting edge was observed every 0.5 km and flank wear was measured in amount to draw a graph showing how flank wear varies in amount with a cutting distance. A line indicating an amount of wear of 200 μm is drawn in the graph, and a cutting distance at an intersection of the line and the graph showing how wear varies in amount is read as a tool life. A result is indicated in table 1 at the "tool life" column.

TABLE 1

| sample Nos. | conditions for synthesizing cBN powder catalyst | conditions for synthesizing cBN powder holding time min. | conditions for heat treatment of cBN powder temp. °C. | conditions for heat treatment of cBN powder time hrs | cBN sintered material cBN grains vol % | cBN sintered material binder phase vol % | cBN sintered material binder phase composition | cBN sintered material cBN grains carbon content mass % | cBN sintered material cBN grains Ca content mass % | cBN sintered material free carbon | cBN sintered material carbon content determined | cutting test tool life (km) |
|---|---|---|---|---|---|---|---|---|---|---|---|---|
| 1-1 | LiCaBN$_2$ | 30 | 700 | 1 | 90 | 10 | WC, Co, Al$_2$O$_3$, Zr | 0.08 | 0.1 | none | equal | 3.3 |
| 1-2 | LiCaBN$_2$ | 30 | 900 | 1 | 90 | 10 | WC, Co, Al$_2$O$_3$, Zr | 0.001 | 0.1 | none | equal | 3.2 |
| 1-3 | LiCaBN$_2$ | 30 | 700 | 2 | 90 | 10 | WC, Co, Al$_2$O$_3$, Zr | 0.05 | 0.1 | none | equal | 3.7 |
| 1-4 | LiCaBN$_2$ | 30 | 900 | 2 | 90 | 10 | WC, Co, Al$_2$O$_3$, Zr | 0.005 | 0.1 | none | equal | 3.5 |
| 1-5 | LiCaBN$_2$ | 30 | 700 | 3 | 90 | 10 | WC, Co, Al$_2$O3, Zr | 0.035 | 0.1 | none | equal | 4 |
| 1-6 | LiCaBN$_2$ | 30 | 900 | 3 | 90 | 10 | WC, Co, Al$_2$O$_3$, Zr | 0.008 | 0.1 | none | equal | 3.8 |
| 1-7 | LiCaBN$_2$ | 60 | 700 | 3 | 90 | 10 | WC, Co, Al$_2$O$_3$, Zr | 0.035 | 0.2 | none | equal | 3.1 |
| 1-8 | LiCaBN$_2$ | 5 | 700 | 3 | 90 | 10 | WC, Co, Al$_2$O$_3$, Zr | 0.035 | 0.02 | none | equal | 3.2 |
| 1-9 | LiCaBN$_2$ | 50 | 700 | 3 | 90 | 10 | WC, Co, Al$_2$O$_3$, Zr | 0.035 | 0.17 | none | equal | 3.5 |
| 1-10 | LiCaBN$_2$ | 10 | 700 | 3 | 90 | 10 | WC, Co, Al$_2$O$_3$, Zr | 0.035 | 0.05 | none | equal | 3.7 |
| 1-11 | LiCaBN$_2$ | 40 | 700 | 3 | 90 | 10 | WC, Co, Al$_2$O$_3$, Zr | 0.035 | 0.15 | none | equal | 3.9 |
| 1-12 | LiCaBN$_2$ | 20 | 700 | 3 | 90 | 10 | WC, Co, Al$_2$O$_3$, Zr | 0.035 | 0.07 | none | equal | 3.8 |
| 1-13 | LiCaBN$_2$ | 30 | 700 | 3 | 90 | 10 | WC, Co, Al$_2$O$_3$, Cr | 0.035 | 0.1 | none | equal | 4.1 |
| 1-14 | LiCaBN$_2$ | 30 | 700 | 3 | 90 | 10 | WC, Co, Al$_2$O$_3$, Ni, Nb | 0.035 | 0.1 | none | equal | 3.9 |
| 1-15 | LiCaBN$_2$ | 30 | 700 | 3 | 90 | 10 | WC, Co, Al$_2$O$_3$, ZrN | 0.035 | 0.1 | none | equal | 3.9 |
| 1-16 | LiCaBN$_2$ | 30 | 700 | 3 | 90 | 10 | WC, Co, Al$_2$O$_3$, CrN | 0.035 | 0.1 | none | equal | 3.9 |
| 1-17 | LiCaBN$_2$ | 30 | 700 | 3 | 95 | 5 | WC, Co, Al$_2$O$_3$, CrN | 0.035 | 0.1 | none | equal | 4 |
| 1-18 | LiCaBN$_2$ | 30 | 700 | 3 | 85 | 15 | WC, Co, Al$_2$O$_3$, CrN | 0.035 | 0.1 | none | equal | 3.7 |
| 1-19 | LiCaBN$_2$ | 30 | 700 | 3 | 80 | 20 | WC, Co, Al$_2$O$_3$, CrN | 0.035 | 0.1 | none | equal | 3.5 |
| 1-20 | LiCaBN$_2$ | 30 | 700 | 3 | 99 | 1 | WC, Co, Al$_2$O$_3$, CrN | 0.035 | 0.1 | none | equal | 4.1 |
| 1-21 | LiCaBN$_2$ | 30 | — | — | 90 | 10 | WC, Co, Al$_2$O$_3$, Zr | 0.1 | 0.1 | none | equal | 1.5 |
| 1-22 | LiBN$_2$ | 30 | 700 | 3 | 90 | 10 | WC, Co, Al$_2$O$_3$, Zr | 0.035 | <0.001 | none | equal | 3 |
| 1-23 | LiCaBN$_2$ | 30 | 900 | 10 | 90 | 10 | WC, Co, Al$_2$O$_3$, Zr | <0.001 | 0.1 | none | equal | 4 |
| 1-24 | LiCaBN$_2$ | 30 | 700 | 3 | 100 | 0 | — | 0.035 | 0.1 | none | equal | 1.5 |
| 1-25 | LiCaBN$_2$ | 30 | 700 | 3 | 98 | 2 | Al$_2$O$_3$ | 0.035 | 0.1 | none | equal | 3.1 |
| 1-26 | LiCaBN$_2$ | 30 | 700 | 3 | 90 | 10 | WC, Co, Al$_2$O$_3$, Zr | 0.035 | 0.1 | 0.1% binder phase | intra-grain < interface | 1.2 |
| 1-27 | LiCaBN$_2$ | 30 | 700 | 3 | 90 | 10 | CoAlCr | 0.035 | 0.1 | none | equal | 3.9 |
| 1-28 | LiCaBN$_2$ | 30 | 700 | 3 | 90 | 10 | WC, Co, Al$_2$O$_3$, Zr | 0.035 | 0.1 | none | intra-grain < interface | 3.0 |

<Discussions>

The cBN sintered materials of sample 1-1 to sample 1-20, sample 1-22, sample 1-23, sample 1-25, sample 1-27, and sample 1-28 correspond to examples.

The cBN sintered material of sample 1-21 corresponds to a comparative example as it comprises cBN grains having a carbon content exceeding 0.08% by mass.

The cBN sintered material of sample 1-24 corresponds to a comparative example as it is composed of 100% by volume of cBN grains and does not comprise a binder phase.

The cBN sintered material of sample 1-26 corresponds to a comparative example as it contains 0.1% of free carbon. Note that the free carbon was present in the binder phase.

<Discussions>

It has been confirmed that the cBN sintered materials of the examples (i.e., sample 1-1 to sample 1-20, sample 1-22, sample 1-23, sample 1-25, sample 1-27, and sample 1-28) have a longer tool life than the cBN sintered materials of the comparative examples (sample 1-21, sample 1-24, and sample 1-26).

Example 2

(Sample 2-1)

A cBN powder was obtained in the same manner as in sample 1-1. The cBN powder was subjected to heat treatment in an $NH_3$ atmosphere (under the atmospheric pressure) at 700° C. for 1 hour.

Titanium (Ti) powder, aluminum (Al) powder, and TiN powder were mixed at a mass ratio of 37:22:41 and heat-treated in an argon atmosphere at 1500° C. for 60 minutes to obtain a single-phase compound having a composition of $Ti_2AlN$. The single-phase compound was agitated and pulverized in a wet ball mill to obtain $Ti_2AlN$ powder having a particle diameter (D50) of 0.5 μm.

The cBN powder, $Ti_2AlN$ powder, and TiN powder were mixed in a ball mill to obtain a powdery mixture. The cBN powder, the $Ti_2AlN$ powder and the TiN powder were mixed together at a ratio adjusted such that a ratio of the cBN powder in the powdery mixture was 70% by volume, and a mass ratio of the $Ti_2AlN$ powder and the TiN powder was set to 1:1.

Subsequently, the powdery mixture was brought into contact with a WC-6% Co cemented carbide disc and a Co (cobalt) foil and thus introduced into a container made of Ta (tantalum), and the container was vacuumed and sealed. Using a belt-type ultrahigh-pressure and ultrahigh-temperature generator, the powdery mixture in the vacuumed and sealed container was held at 6.5 GPa and 1500° C. for 15 minutes and thus sintered to obtain a cBN sintered material for sample 2-1.

(Sample 2-2 to Sample 2-6)

cBN sintered materials were produced in the same manner as in sample 2-1 except that the cBN powder was subjected to heat treatment under conditions indicated in table 2.

(Sample 2-7 to Sample 2-12> cBN sintered materials were produced in the same manner as in sample 2-5 except that in producing the cBN powder, a holding time at 5 GPa and 1450° C. was changed to those indicated in table 2.

(Sample 2-13)

A cBN sintered material was produced in the same manner as in sample 2-5 except that TiNbCN powder was used instead of TiN powder. The TiNbCN powder was produced through the following procedure:

$TiO_2$ powder, $Nb_2O_5$ powder, and carbon powder were mixed at a ratio in mass of 57.19:16.79:26.02 and heat-treated at 2150° C. for 60 minutes in a nitrogen atmosphere to obtain a single-phase compound having a composition of TiNbCN.

The single-phase compound was agitated and pulverized in a wet ball mill to obtain TiNbCN powder having a particle diameter (D50) of 0.5 μm.

(Sample 2-14)

A cBN sintered material was produced in the same manner as in sample 2-5 except that TiZrCN powder was used instead of TiN powder. The TiZrCN powder was produced through the following procedure:

$TiO_2$ powder, $ZrO_2$ powder, and carbon powder were mixed at a ratio in mass of 58.35:15.88:25.77 and heat-treated at 2150° C. for 60 minutes in a nitrogen atmosphere to obtain a single-phase compound having a composition of TiZrCN. The single-phase compound was agitated and pulverized in a wet ball mill to obtain TiZrCN powder having a particle diameter (D50) of 0.5 μm.

(Sample 2-15)

A cBN sintered material was produced in the same manner as in sample 2-5 except that TiHfCN powder was used instead of TiN powder. The TiHfCN powder was produced through the following procedure:

$TiO_2$ powder, $HfO_2$ powder, and carbon powder were mixed at a ratio in mass of 52.45:24.38:23.17 and heat-treated at 2150° C. for 60 minutes in a nitrogen atmosphere to obtain a single-phase compound having a composition of TiHfCN. The single-phase compound was agitated and pulverized in a wet ball mill to obtain TiHfCN powder having a particle diameter (D50) of 0.5 μm.

(Sample 2-16)

A cBN sintered material was produced in the same manner as in sample 2-5 except that TiCrCN powder was used instead of TiN powder. The TiCrCN powder was produced through the following procedure:

$TiO_2$ powder, $Cr_2O_3$ powder and carbon powder were mixed at a ratio in mass of 62.64:10.52:26.84 and heat-treated at 2150° C. for 60 minutes in a nitrogen atmosphere to obtain a single-phase compound having a composition of TiCrCN. The single-phase compound was agitated and pulverized in a wet ball mill to obtain TiCrCN powder having a particle diameter (D50) of 0.5 μm.

(Samples 2-17 to Sample 2-20, and Sample 2-24)

CBN sintered materials were produced in the same manner as in sample 2-5, except that a ratio in volume of the cBN powder and the binder powder was adjusted to allow each cBN sintered material to have a cBN grain content indicated in table 2.

(Sample 2-21)

A cBN sintered material was produced in the same manner as in sample 2-5, except that a ratio in volume of the cBN powder and the binder powder was adjusted to allow the cBN sintered material to have a cBN grain content indicated in table 2 and the cBN powder was not subjected to heat treatment.

(Sample 2-22)

A cBN sintered material was produced in the same manner as in sample 2-5, except that a ratio in volume of the cBN powder and the binder powder was adjusted to allow the cBN sintered material to have a cBN grain content indicated in table 2 and $LiBN_2$ was used instead of $LiCaBN_2$ in producing the cBN powder.

(Sample 2-23)

A cBN sintered material was produced in the same manner as in sample 2-5, except that a ratio in volume of the cBN powder and the binder powder was adjusted to allow the cBN sintered material to have a cBN grain content indicated in table 2 and the cBN powder was subjected to heat treatment at 900° C. for 10 hours.

<Evaluation>

(Composition of cBN Sintered Material, Composition of Binder Phase, Carbon Content of cBN Grains, Calcium Content of cBN Grains, and Confirmation of Presence/Absence of Free Carbon)

Each produced cBN sintered material had measured its own composition, the binder phase's composition, the cBN grains' carbon and calcium contents, and the free carbon's concentration. How they were specifically measured will not be described as it is identical to that described in an embodiment for implementing the present invention, as has been described above. A result is shown in Table 2.

(Cutting Test)

The cBN sintered material of each sample produced was used to produce a cutting tool having a cutting edge composed of the cBN sintered material (with a substrate having a shape: DNGA150412, and a cutting-edge treatment: S01225). Using this, a cutting test was performed under cutting conditions indicated below: The following cutting conditions correspond to high-efficiency machining for high-strength hardened steel.

Cutting speed: 200 m/min
Feed rate: 0.2 mm/rev
Depth of cut: 0.2 mm
Coolant: (Dry)
Cutting method: interrupted cutting
Lathe: LB400 (manufactured by Okuma Corporation)
Workpiece: Hardened steel (SCM415 carburized-quenched and having a hardness of 60 HRC, with a circumference having five grooves each in the form of the letter V in cross section)

Evaluation Method: The cutting edge was observed every 0.5 km and flank wear was measured in amount to draw a graph showing how flank wear varies in amount with a cutting distance. A line indicating an amount of wear of 200 μm is drawn in the graph, and a cutting distance at an intersection of the line and the graph showing how wear varies in amount is read as a tool life. A result is indicated in table 2 at the "tool life" column.

TABLE 2

| sample Nos. | conditions for synthesizing cBN powder | | conditions for heat treatment of cBN powder | | cBN sintered material | | | | | | cutting test |
|---|---|---|---|---|---|---|---|---|---|---|---|
| | | | | | cBN grains vol % | binder phase vol % | binder phase composition | cBN grains carbon content mass % | cBN grains Ca content mass % | free carbon | tool life (km) |
| | catalyst | holding time min. | temperature ° C. | time hours | | | | | | | |
| 2-1 | LiCaBN$_2$ | 30 | 700 | 1 | 70 | 30 | TiN,AlN,Al$_2$O$_3$,TiB$_2$ | 0.08 | 0.1 | none | 3.3 |
| 2-2 | LiCaBN$_2$ | 30 | 900 | 1 | 70 | 30 | TiN,AlN,Al$_2$O$_3$,TiB$_2$ | 0.001 | 0.1 | none | 3.2 |
| 2-3 | LiCaBN$_2$ | 30 | 700 | 2 | 70 | 30 | TiN,AlN,Al$_2$O$_3$,TiB$_2$ | 0.08 | 0.1 | none | 3.7 |
| 2-4 | LiCaBN$_2$ | 30 | 900 | 2 | 70 | 30 | TiN,AlN,Al$_2$O$_3$,TiB$_2$ | 0.005 | 0.1 | none | 3.5 |
| 2-5 | LiCaBN$_2$ | 30 | 700 | 3 | 70 | 30 | TiN,AlN,Al$_2$O$_3$,TiB$_2$ | 0.04 | 0.1 | none | 4 |
| 2-6 | LiCaBN$_2$ | 30 | 900 | 3 | 70 | 30 | TiN,AlN,Al$_2$O$_3$,TiB$_2$ | 0.008 | 0.1 | none | 3.8 |
| 2-7 | LiCaBN$_2$ | 60 | 700 | 3 | 70 | 30 | TiN,AlN,Al$_2$O$_3$,TiB$_2$ | 0.04 | 0.2 | none | 3.1 |
| 2-8 | LiCaBN$_2$ | 5 | 700 | 3 | 70 | 30 | TiN,AlN,Al$_2$O$_3$,TiB$_2$ | 0.04 | 0.02 | none | 3.2 |
| 2-9 | LiCaBN$_2$ | 50 | 700 | 3 | 70 | 30 | TiN,AlN,Al$_2$O$_3$,TiB$_2$ | 0.04 | 0.17 | none | 3.5 |
| 2-10 | LiCaBN$_2$ | 10 | 700 | 3 | 70 | 30 | TiN,AlN,Al$_2$O$_3$,TiB$_2$ | 0.04 | 0.05 | none | 3.7 |
| 2-11 | LiCaBN$_2$ | 40 | 700 | 3 | 70 | 30 | TiN,AlN,Al$_2$O$_3$,TiB$_2$ | 0.04 | 0.15 | none | 3.9 |
| 2-12 | LiCaBN$_2$ | 20 | 700 | 3 | 70 | 30 | TiN,AlN,Al$_2$O$_3$,TiB$_2$ | 0.04 | 0.07 | none | 3.8 |
| 2-13 | LiCaBN$_2$ | 30 | 700 | 3 | 70 | 30 | TiNbCN,AlN,Al$_2$O$_3$,TiB$_2$ | 0.04 | 0.1 | none | 4.1 |
| 2-14 | LiCaBN$_2$ | 30 | 700 | 3 | 70 | 30 | TiZrCN,AlN,Al$_2$O$_3$,TiB$_2$ | 0.04 | 0.1 | none | 3.9 |
| 2-15 | LiCaBN$_2$ | 30 | 700 | 3 | 70 | 30 | TiHfCN,AlN,Al$_2$O$_3$,TiB$_2$ | 0.04 | 0.1 | none | 3.9 |
| 2-16 | LiCaBN$_2$ | 30 | 700 | 3 | 70 | 30 | TiCrCN,AlN,Al$_2$O$_3$,TiB$_2$ | 0.04 | 0.1 | none | 3.9 |
| 2-17 | LiCaBN$_2$ | 30 | 700 | 3 | 75 | 25 | TiN,AlN,Al$_2$O$_3$,TiB$_2$ | 0.04 | 0.1 | none | 4 |
| 2-18 | LiCaBN$_2$ | 30 | 700 | 3 | 60 | 40 | TiN,AlN,Al$_2$O$_3$,TiB$_2$ | 0.04 | 0.1 | none | 3.7 |
| 2-19 | LiCaBN$_2$ | 30 | 700 | 3 | 50 | 50 | TiN,AlN,Al$_2$O$_3$,TiB$_2$ | 0.04 | 0.1 | none | 3.5 |
| 2-20 | LiCaBN$_2$ | 30 | 700 | 3 | 40 | 60 | TiN,AlN,Al$_2$O$_3$,TiB$_2$ | 0.04 | 0.1 | none | 3.3 |
| 2-21 | LiCaBN$_2$ | 30 | — | — | 90 | 10 | TiN,AlN,Al$_2$O$_3$,TiB$_2$ | 0.1 | 0.1 | none | 1.5 |
| 2-22 | LiBN$_2$ | | 700 | 3 | 90 | 10 | TiN,AlN,Al$_2$O$_3$,TiB$_2$ | 0.04 | <0.001 | none | 3 |
| 2-23 | LiCaBN$_2$ | 30 | 900 | 10 | 90 | 10 | TiN,AlN,Al$_2$O$_3$,TiB$_2$ | <0.001 | 0.1 | none | 4 |
| 2-24 | LiCaBN$_2$ | 30 | 700 | 3 | 25 | 75 | TiN,AlN,Al$_2$O$_3$,TiB$_2$ | 0.04 | 0.1 | none | 1.5 |

The cBN sintered materials of sample 2-1 to sample 2-20, sample 2-22 and sample 2-23 correspond to examples.

Sample 2-21 corresponds to a comparative example as it comprises cBN grains having a carbon content exceeding 0.08% by mass.

The cBN sintered material of sample 2-24 corresponds to a comparative example as it has a cBN grain content of 25% by volume.

<Discussions>

It has been confirmed that the cBN sintered materials of the examples (i.e., sample 2-1 to sample 2-20, sample 2-22, and sample 2-23) have a longer tool life than the cBN sintered materials of the comparative examples (sample 2-21 and sample 2-24).

While embodiments and examples of the present disclosure have been described as above, it is also planned from the beginning that the configurations of the above-described embodiments and examples are appropriately combined and variously modified.

The embodiments and examples disclosed herein are illustrative in any respects and should not be construed as being restrictive. The scope of the present invention is defined by the terms of the claims, rather than the above-described embodiments and examples, and is intended to include any modifications within the scope and meaning equivalent to the claims.

The invention claimed is:

1. A cubic boron nitride sintered material comprising 30% by volume or more and 99.9% by volume or less of cubic boron nitride grains and 0.1% by volume or more and 70% by volume or less of a binder phase, the binder phase including:
  at least one selected from the group consisting of: a simple substance selected from the group consisting of a group 4 element, a group 5 element and a group 6 element of the periodic table, aluminum, silicon, cobalt and nickel; an alloy thereof; and an intermetallic compound thereof;
  at least one selected from the group consisting of: a compound consisting of at least one element selected from the group consisting of a group 4 element, a group 5 element and a group 6 element of the periodic table, aluminum, silicon, cobalt and nickel, and at least one element selected from the group consisting of nitrogen, carbon, boron and oxygen; and a solid solution derived from the compound; or
  at least one selected from the group consisting of a simple substance selected from the group consisting of a group 4 element, a group 5 element and a group 6 element of the periodic table, aluminum, silicon, cobalt and nickel, an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel and at least one element selected from the group consisting of nitrogen, carbon, boron and oxygen, and a solid solution derived from the compound, the cubic boron nitride grain having a carbon content of 0.08% by mass or less, the cubic boron nitride sintered material being a cubic boron nitride sintered material free of free carbon, the cubic boron nitride grains having a calcium content of 0.02% by mass or more and 0.2% by mass or less, and wherein an interface between the cubic boron nitride grains has a carbon content equal to or smaller than that of the cubic boron nitride grains.

2. The cubic boron nitride sintered material according to claim 1, wherein the cubic boron nitride grains have a carbon content of 0.05% by mass or less.

3. The cubic boron nitride sintered material according to claim 1, wherein the cubic boron nitride grains have a carbon content of 0.035% by mass or less.

4. The cubic boron nitride sintered material according to claim 1, wherein the cubic boron nitride grains have a calcium content of 0.05% by mass or more and 0.17% by mass or less.

5. The cubic boron nitride sintered material according to claim 1, wherein the cubic boron nitride grains have a calcium content of 0.07% by mass or more and 0.15% by mass or less.

6. The cubic boron nitride sintered material according to claim 1, comprising 45% by volume or more and 95% by volume or less of the cubic boron nitride grains.

* * * * *